US00H002115H

(19) United States
(12) Statutory Invention Registration
Grilliot

(10) Reg. No.: US H2115 H
(43) Published: Mar. 1, 2005

(54) PROTECTIVE GARMENT PACKED IN SEALED POUCH WHEREIN PARTIAL VACUUM IS DRAWN

(75) Inventor: Mary I. Grilliot, Dayton, OH (US)

(73) Assignee: Morning Pride Manufacturing, L.L.C., Dayton, OH (US)

(21) Appl. No.: 10/166,949

(22) Filed: Jun. 11, 2002

(65) Prior Publication Data

US 2003/0226196 A1 Dec. 11, 2003

(51) Int. Cl.[7] ..... A41D 13/00
(52) U.S. Cl. ..... 2/457
(58) Field of Search ..... 2/457

(56) References Cited

U.S. PATENT DOCUMENTS 4,272,851 A * 6/1981 Goldstein ..... 2/79
4,864,654 A * 9/1989 Schriver et al. ..... 2/84
6,364,980 B1 * 4/2002 Smith et al. ..... 156/108

* cited by examiner

*Primary Examiner*—Jack Keith
*Assistant Examiner*—M. Thomson
(74) *Attorney, Agent, or Firm*—Wood, Phillips, Katz, Clark & Mortimer

(57) ABSTRACT

For a person, such as a firefighter, a rescue worker, or a chemical or laboratory worker, who is preparing to work in a hazardous environment, a pack is prepared by providing a pouch, which is sealable so as to be fluid-tight, by packing a protective garment in the pouch, by sealing the pouch so as to be fluid-tight after the protective garment has been packed in the pouch so as to protect the protective garment against contamination before the pouch is opened, and by drawing a partial vacuum in the pouch so as to collapse the pouch against what has been packed in the pouch, when the pouch is sealed, thus not only to reduce overall bulkiness of the pack but also to provide evidence, if there is a perceptible loss of the partial vacuum, that the pouch has been tampered with or that the pouch has been opened. Other gear of diverse types may be packed with the protective garment.

4 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROTECTIVE GARMENT PACKED IN SEALED POUCH WHEREIN PARTIAL VACUUM IS DRAWN

TECHNICAL FIELD OF THE INVENTION

This invention pertains to a novel pack having a protective garment, which is packed in a sealed pouch wherein which a partial vacuum is drawn, whereby to provide evidence, if there is a perceptible loss of the partial vacuum, that the pouch has been tampered with or that the pouch has been opened.

BACKGROUND OF THE INVENTION

Commonly, when working in a hazardous environment, which may be oxygen-deficient or which may expose occupants to chemical or biological toxins, pathogens, or other hazards, a firefighter, a rescue worker, or a chemical or laboratory worker wears a protective garment, which is made from sheets of fluid-impervious films or from sheets of fluid-impervious fabrics. Such protective garments are exemplified in U.S. Pat. Nos. 4,272,851, No. 4,864,654, and 6,364,980, which disclose suitable films, fabrics, and laminates and the disclosures of which are incorporated herein by reference.

As exemplified in U.S. Pat. No. 4,864,654, it is known for a worker wearing a protective garment, as described above, to wear a self-contained breathing apparatus, which comprises an air bottle, among other elements, and all elements of which are worn within the protective garment. Further, it is known for a worker wearing a protective garment, as described above, also to wear other gear of diverse types, as exemplified by gloves, dosimeters, and breathing apparatus.

Usually, after having been used in hazardous environments, protective garments made from sheets of fluid-impervious films are regarded as disposable and are not cleaned, decontaminated, or reconditioned. In any event, a person preparing to be in a hazardous environment needs to don a protective garment that is new or that has been cleaned, decontaminated, and reconditioned properly, not a protective garment that has been used before either in a hazardous environment or in a training environment but that has not been cleaned, decontaminated, and reconditioned properly.

SUMMARY OF THE INVENTION

This invention provides, for a person preparing to be in a hazardous environment, a pack comprising a protective garment and a pouch, in which the protective garment is packed and which is sealed after the protective garment has been packed in the pouch so as to protect the protective garment against contamination before the pack is opened. Other gear may be packed with the protective garment. A partial vacuum is drawn so as to collapse the pouch against what has been packed in the pouch, when the pouch is sealed, thus not only to reduce overall bulkiness of the pouch and what has been packed in the pouch but also to provide evidence, if there is a perceptible loss of the partial vacuum, that the pack has been tampered with or that the pack has been opened.

DETAILED DESCRIPTION OF THE ILLUSTRATED EMBODIMENT

Figure 1:
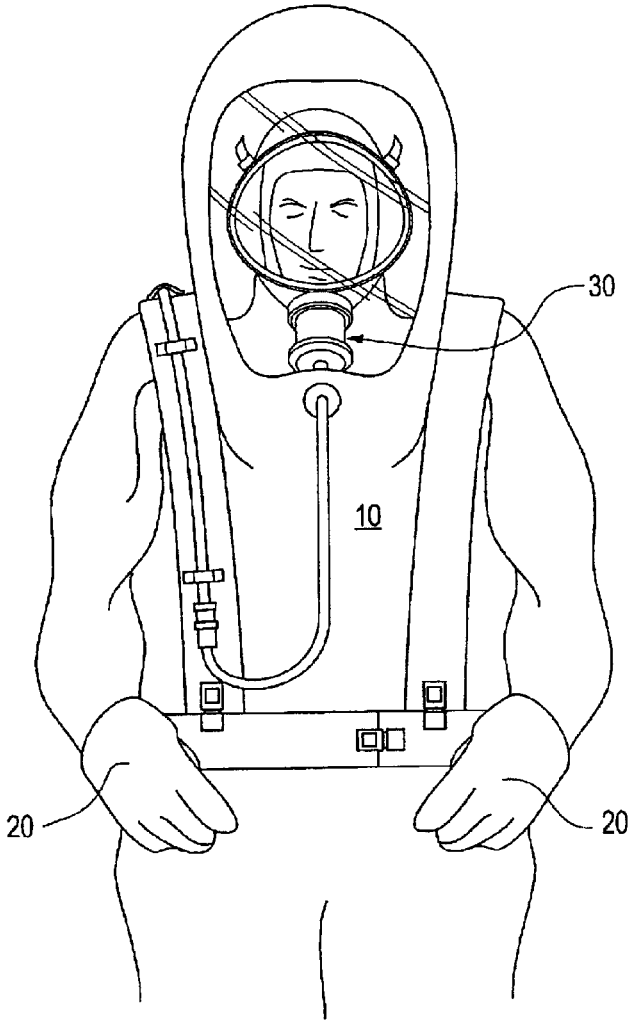
FIG. 1 is a fragmentary, perspective, frontal view of a person wearing a protective garment and other gear, which includes breathing apparatus.

As illustrated in FIG. 1, a person is wearing a protective garment 10, which is made predominantly from any suitable film, fabric, or laminate, such as a laminate of non-woven, spun-bonded olefin and polyethylene, e.g. TYVEK™ material, along with other gear including gloves 20 and including self-contained breathing apparatus 30. FIG. 1 is adapted from FIG. 1 of U.S. Appl. No. 10/151,390, which was filed on May 20, 2002, for Sheet With Elastomeric Grommet to Provide Fluid-Impervious Seal Around Object Penetrating Sheet, which is assigned commonly herewith, and the disclosure of which is incorporated herein by reference.

Figure 2:
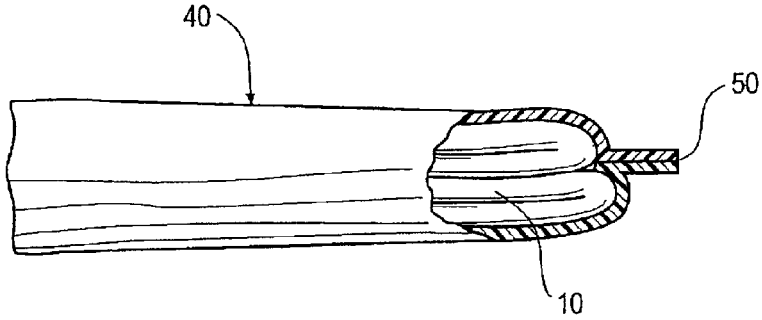
FIG. 2 is a fragmentary, perspective, partially broken away view of a pack according to this invention and comprising a sealed pouch, in which the protective garment has been packed.

As illustrated in FIG. 2, the protective garment 10 has been packed in a pouch 40, which is made from any suitable film, fabric, or laminate, such as the laminate noted in the preceding paragraph, and which is sealable along all edges (e.g. the edge 50) of the pouch 40 that are not folded, in a known manner as by heat sealing or adhesively, so as to be fluid-tight. Further, the pouch 30 has been sealed so as to be fluid-tight after the protective garment 10 has been packed in the pouch 40, possibly with the gloves 20, with elements of the breathing apparatus 30, and with other gear, so as to protect the protective garment 10 and whatever else has been packed in the pouch 40, against contamination before the pouch 40 is opened. Further, a partial vacuum has been drawn in the pouch 40, in a known manner when the pouch 40 is sealed, so as to collapse the pouch 40 against what has been packed in the pouch 40.

Drawing of the partial vacuum serves not only to reduce overall bulkiness of the pouch 40 and what has been packed in the pouch 40 and to protect what has been packed in the pouch 40 against exposure to ozone and other environmental conditions but also to provide evidence to a person preparing to be in a hazardous environment and planning to don the protective garment 10 and to use whatever else has been packed in the pouch 40, if there is a perceptible loss of the partial vacuum, that the pouch 40 has been tampered with or that the pouch 40 has been opened.

What is claimed is:

1. For a person preparing to be in a hazardous environment, a pack comprising a protective garment and a pouch, in which the protective garment is packed, which is sealed so as to be fluid-tight after the protective garment has been packed in the pouch so as to protect the protective garment against contamination before the pouch is opened, and in which a partial vacuum is drawn so as to collapse the pouch against what has been packed in the pouch, when the pouch is sealed, thus not only to reduce overall bulkiness of the pouch and what has been packed in the pouch but also to provide evidence, if there is a perceptible loss of the partial vacuum, that the pouch has been tampered with or that the pouch has been opened.

2. The pack of claim 1 wherein other gear is packed with the protective garment.

3. A method to prepare a pack for a person preparing to be in a hazardous environment, the method comprising steps of providing a pouch, which is sealable so as to be fluid-tight, packing a protective garment in the pouch, sealing the pouch so as to be fluid-tight after the protective garment has been packed in the pouch so as to protect the protective garment against contamination before the pack is opened, and drawing a partial vacuum in the pouch so as to collapse the pouch against what has been packed in the pouch, when the pouch is sealed, thus not only to reduce overall bulkiness of the pouch and what has been packed in the pouch but also to provide evidence, if there is a perceptible loss of the partial vacuum, that the pouch has been tampered with or that the pouch has been opened.

4. The method of claim 3 wherein other gear is packed with the protective garment.

* * * * *